United States Patent
Sepeda et al.

(10) Patent No.: US 7,299,311 B1
(45) Date of Patent: Nov. 20, 2007

(54) APPARATUS AND METHOD FOR ARBITRATING FOR A RESOURCE GROUP WITH PROGRAMMABLE WEIGHTS

(75) Inventors: Chad M. Sepeda, Savage, MN (US);
Kelvin S. Vartti, Hugo, MN (US);
Ross M. Weber, Coon Rapids, MN (US)

(73) Assignee: Unisys Corporation, Blue Bell, PA (US)

( * ) Notice: Subject to any disclaimer, the term of this patent is extended or adjusted under 35 U.S.C. 154(b) by 120 days.

(21) Appl. No.: 11/321,508

(22) Filed: Dec. 29, 2005

(51) Int. Cl.
*G06F 13/18* (2006.01)
(52) U.S. Cl. .................. 710/116; 710/243; 710/244; 710/113
(58) Field of Classification Search ............. 710/113, 710/116, 243, 244
See application file for complete search history.

(56) References Cited

U.S. PATENT DOCUMENTS 5,440,698 A * 8/1995 Sindhu et al. ............. 709/225
5,640,519 A * 6/1997 Langendorf et al. ........ 710/111
2001/0043612 A1* 11/2001 Johnson et al. ............. 370/462
2003/0115393 A1* 6/2003 Kim ........................... 710/240

* cited by examiner

*Primary Examiner*—Glenn A. Auve
(74) *Attorney, Agent, or Firm*—Charles A. Johnson; Robert Marley; Crawford Maunu PLLC

(57) ABSTRACT

A system and method for arbitrating for access to a resource group between agents according to a respective programmable weight for each agent. For each agent, a programmable mapping module selectively couples a respective arbitration handshake signal of the agent to one or more arbitration ports, and the number of the coupled arbitration ports for the agent is the respective programmable weight. A selection module selects one of the arbitration ports in response to a priority ranking of the arbitration ports, and access to the resource group is granted to the agent that has the respective arbitration handshake signal that is selectively coupled by the programmable mapping module to the selected arbitration port. A ranking module provides the priority ranking of the arbitration ports and updates the priority ranking in response to the selection module selecting the selected arbitration port.

23 Claims, 12 Drawing Sheets

APPARATUS AND METHOD FOR ARBITRATING FOR A RESOURCE GROUP WITH PROGRAMMABLE WEIGHTS

FIELD OF THE INVENTION

This invention relates in general to computing systems, and more particularly to an apparatus and method for arbitrating for resources in a computing system.

BACKGROUND

In the field of computing systems there is often the need to share access to a resource between multiple agents. An agent needing access to a resource may be referred to as a "requester" for the resource. When there is more than one requester requesting access to a resource, a selection must be made to determine which requester is currently allowed access the resource. Therefore, arbitration for a resource is generally the selection of agents to be allowed access to the resource. For example, there may be several agents needing to perform a transaction requiring access to the resource of a shared computer bus. Arbitration for the computer bus is the selection of the agent that is allowed to issue the next transaction request onto the computer bus.

Arbitration schemes generally attempt to provide some level of fairness in the allocation of resources. However, many prior arbitration schemes are vulnerable to arbitration problems such as "lock out" and/or "deadlock." More particularly, a competing interest in arbitration schemes is the fact that some requests for a resource may be of a higher priority than others, yet lock out or deadlock may be an undesirable byproduct of placing a heavy emphasis on higher priority requests. For example, if one or more agents can monopolize access to the resource, then the remaining agents may be "locked out" from accessing the resource. Lock out of any agent may cause the computing system to cease making progress on some of the computations being performed by the computing system. Lock out may also cause the entire computing system to cease making any progress at all, a condition denoted system "deadlock." Lock out and especially deadlock must generally be avoided. Prior arbitration schemes are vulnerable to lock out and deadlock.

In prior art arbitration systems, it is often the case that an emphasis is placed on either a fairness to the requesters or deference to high priority requests. Systems placing an emphasis on fairness may not, however, adequately process higher priority requests. For example, a round robin arbitration scheme would grant access to a resource equally between low and high priority requests, which may be undesirable. On the other hand, complete deference to high priority requests may cause lock out and in some cases deadlock for lower priority requests, which may be equally undesirable.

Accordingly, there is a need in the computing systems industry for an improved arbitration scheme that addresses the aforementioned and other shortcomings of the prior art. The present invention fulfills these and other needs, and offers other advantages over prior art arbitration approaches.

SUMMARY

To overcome limitations in the prior art described above, and to overcome other limitations that will become apparent upon reading and understanding the present specification, the present invention discloses a system, apparatus, and method for programmable allocation of accesses to a resource group among multiple agents. The present invention allows allocation of access according to a respective programmable weight for each agent. In this manner, high priority requesters can be allocated a greater share of the access to the resource group than low priority requesters while maintaining fairness that prevents lockout and deadlock.

In accordance with one embodiment of the invention, an apparatus is provided for arbitrating for access to a resource group between agents according to a respective programmable weight for each agent. For each agent, a programmable mapping module selectively couples a respective arbitration handshake signal of the agent to one or more arbitration ports, and the number of the coupled arbitration ports for the agent is the respective programmable weight. A selection module selects one of the arbitration ports in response to a priority ranking of the arbitration ports, and access to the resource group is granted to the agent that has the respective arbitration handshake signal that is selectively coupled by the programmable mapping module to the selected arbitration port. A ranking module provides the priority ranking of the arbitration ports and updates the priority ranking in response to the selection module selecting the selected arbitration port.

In accordance with another embodiment of the invention, a method is provided for programmable allocation of a sequence of accesses to a resource group among a plurality of agents. Each agent is mapped to one or more arbitration ports according to a programmable map, with the number of the arbitration ports for each agent being a respective weight for the agent. The number of the arbitration ports is generally greater than a number of the agents. An allocation of the sequence of the accesses to the resource group among the arbitration ports is fairly determined using a priority ranking of the arbitration ports. The priority ranking of the arbitration ports is dynamically determined by updating the priority ranking for each of access to the resource group of the sequence. The allocation of the sequence of accesses is reverse mapped from the arbitration ports to the agents according to the programmable map.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of a apparatus and method in accordance with the invention.

BRIEF DESCRIPTION OF THE DRAWINGS

The invention is described in connection with the embodiments illustrated in the following diagrams.

DETAILED DESCRIPTION

In the following description of various exemplary embodiments, reference is made to the accompanying drawings which form a part hereof, and in which is shown by way of illustration various embodiments in which the invention may be practiced. It is to be understood that other embodiments may be utilized, as structural and operational changes may be made without departing from the scope of the present invention.

Generally, the present invention provides methods and modules for arbitrating among agents for access to a shared resource group, with an arbitration weight accorded to each agent and access apportioned to each agent according to the respective agent's weight. The arbitration weights correspond to values that may be programmable in certain embodiments of the invention. Overall system performance may be improved through appropriate selection of the arbitration weight for each agent. Arbitration is guaranteed to avoid lock out and deadlock for any programmed combination of arbitration weights, while still allowing a desired level of priority differentiation based on the relative arbitration weights.

Figure 1:
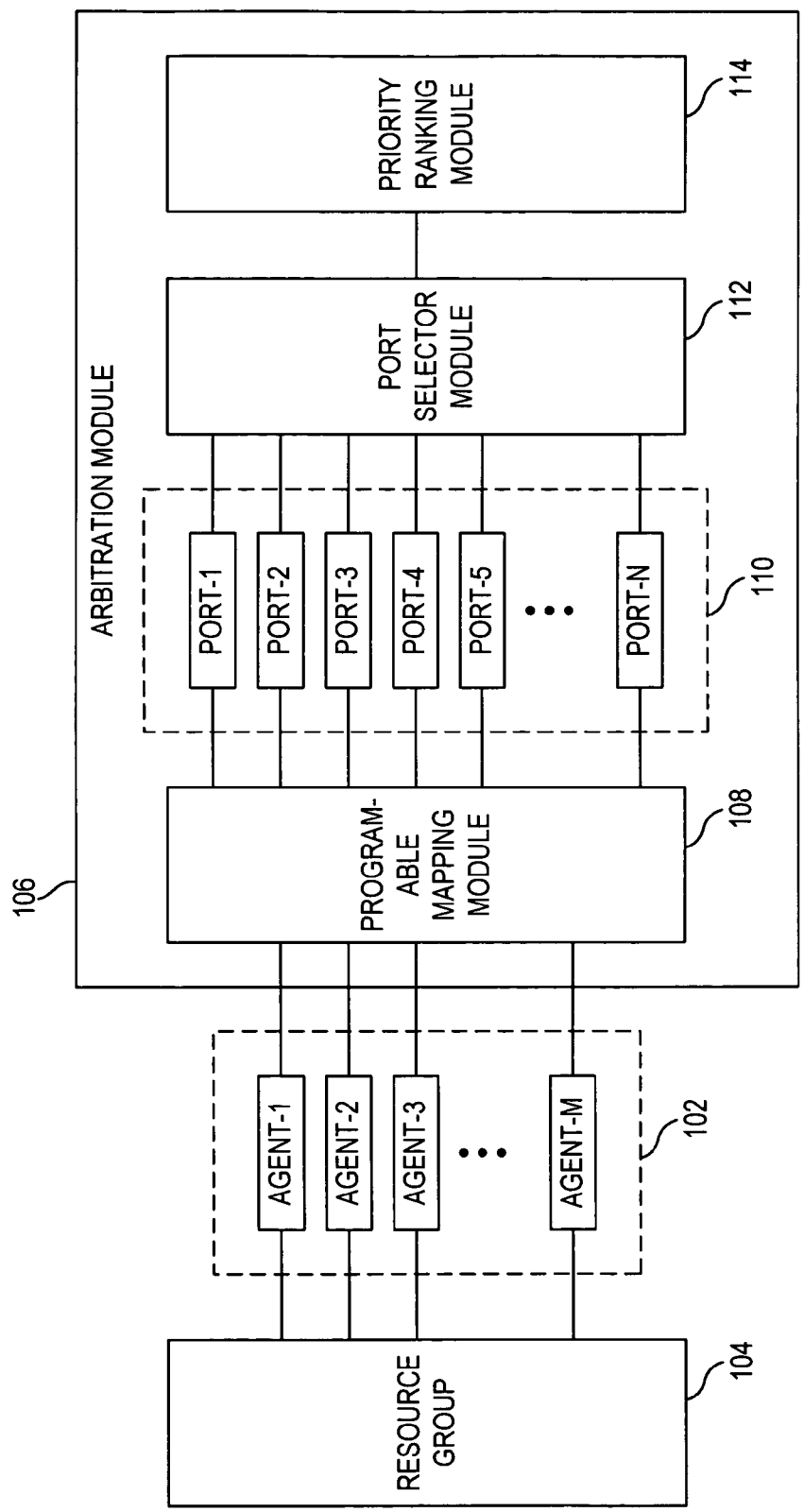
FIG. 1 is a system diagram of an exemplary embodiment of the present invention.

FIG. 1 is a system diagram illustrating an exemplary embodiment of an arbitration scheme in accordance with the principles of the present invention. A number of agents 102 are vying for access to a resource group 104. The resource group 104 represents any one or more resources to which the agents 102 are seeking access, such as a bus(es), memory(s), execution pipelines, etc. The arbitration module 106 according to one embodiment of the present invention is used to apportion access to the resource group 104 among the agents 102. A programmable mapping module 108 is used to map the agents 102 to a particular one or more of the arbitration ports 110. The port selection module 112 allocates access to the resource group 104 to one of the arbitration ports 110 at a time, according to the priority ranking of the arbitration ports provided by the priority ranking module 114. The port allocated access is mapped back to one of the agents 102 by the mapping module 108, whereby that agent is allocated access to the resource group 104.

As indicated above, the mapping module 108 is used to map between agents 102 and arbitration ports 110, such that agents 102 are mapped to arbitration ports 110, and arbitration ports 110 are correspondingly mapped to agents 102. In accordance with one embodiment of the invention, there are more ports 110 than agents 102, such that the mapping module 108 maps each of the agents 102 to at least one, and in some cases more than one of the ports 110. The arbitration weight of each of the agents 102 corresponds to the number of the ports 110 to which the agent is mapped. Often the mapping module 108 correspondingly maps each of the ports 110 back to exactly one of the agents 102. In general the mapping module 108 corresponding maps each of the ports 110 back to one or none of the agents 102. As is discussed more fully below, any of the ports 110 that is not mapped to an agent 102 may be mapped to an internal agent of the arbitration module 106 denoted the null requester.

In one embodiment the port selector 112 allocates access to the port 110 that has the highest priority ranking as assigned by the priority ranking module 114. After the port allocated access is mapped back to one of the agents 102 by the mapping module 108, the ranks for the ports 110 are modified in the priority ranking module 114 by moving the port allocated access to the lowest priority in one embodiment of the invention. The modification of port ranking in this manner is discussed more fully below.

The exemplary embodiment of FIG. 1 thus illustrates one manner in which requesting agents 102 can gain access to one or more resources depicted as the resource group 104. Because one or more of the agents 102 can be mapped to more than one of the ports 110, and because arbitration weighting is dependent on the number of ports to which the agents are mapped, some agents can be accorded a greater arbitration weight than others. For example, a first one of the agents 102 may be mapped to one of the ports 110, while a second of the agents 102 may be mapped to two of the ports 110. The "arbitration weight" accorded to the second agent is therefore twice that of the first agent, as the second agent occupies two of the ports. Because each of the ports 110 will ultimately be allowed access to the resource group 104, the second agent may be granted access to the resource group two times for every one time that the first agent will be granted access to the resource group 104. This allows different ones of the agents 102 to have different resource allocation weightings relative to one another, thereby allowing some agents to be granted access to the resource group 104 more than others. In addition, the priority ranking module 114 adjusts the relative rankings of the ports 110, to ensure that each of the agents 102 is granted access to the resource group 104.

Figure 2:
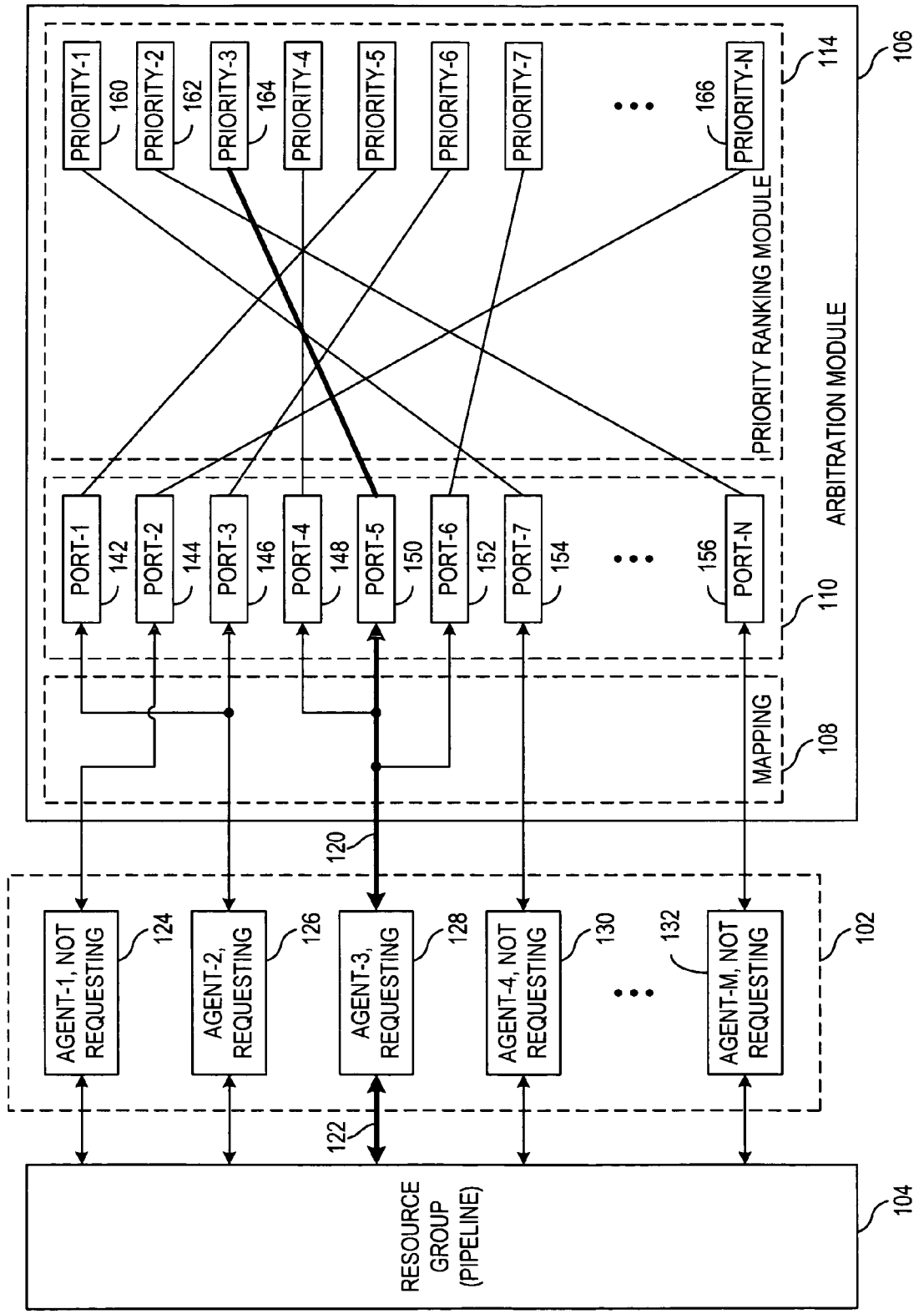
FIG. 2 is a system diagram illustrating arbitration with requesting and non-requesting agents in accordance with various embodiments of the invention.

FIG. 2 illustrates another embodiment of an arrangement for arbitrating for access to a resource group 104 by agents 102. The agents 102 include a plurality of agents 124, 126, 128, 130, and 132, which collectively share access to the resource group 104. The arbitration module 106 determines which of the agents 102 is allocated access to the resource group 104 at a particular time. For example, arbitration module 106 may allocate access to agent-3 (128) using arbitration handshake signal on line 120, and in response agent-3 (128) may issue a transaction on line (122) to resource group 104. For purposes of the example shown in FIG. 2, agent-2 (126) and agent-3 (128) are currently requesting access to the resource group 104, while agent-1 (124), agent-4 (130), and agent-m (132) are not currently requesting access to the resource group 104.

The mapping module 108 associated with the arbitration module 106 maps the various agents 102 and corresponding arbitration handshake, such as arbitration handshake signal 120 for agent-3 (128), to particular ones of the arbitration ports 110. The ports 110 of FIG. 2 include ports 142, 144, 146, 148, 150, 152, 154, and 156. The priority ranking module 114 assigns a priority rank to each of the ports 110.

The mapping module 108 maps agent-1 (124) to port-2 (144) and correspondingly maps port-2 (144) to agent-1 (124). Agent-1 (124) has a weight of one because agent-1 (124) is mapped to one port. Agent-2 (126) is mapped to two ports, namely port-1 (142) and port-3 (146), and therefore has a weight of two. Agent-3 (128) is mapped to three ports, namely port-4 (148), port-5 (150), and port-6 (152), and therefore has a weight of three. Agent-4 (130) is mapped to port-7 (154) and agent-m (132) is mapped to port-n (156), whereby each of these agents has a weight of one because each is mapped to only one port.

The following is a description of an operational example of the arbitration module 106 in accordance with one embodiment of the invention. As seen in FIG. 2, the priority ranking module 114 associates a priority ranking with each of the various ports 110. These priorities indicate which of the ports 110 will be granted access to the resource group 104 relative to the other ports 110. For example, the priority-1 (160) block represents the top priority, priority-2 (162) represents the next highest priority, and so forth through priority-n (166) which represents the lowest priority. The priority ranking changes during the arbitration procedure, which is described in greater detail below.

According to one embodiment of the invention, the arbitration module 106 first considers the top priority port provided by priority ranking 114 as priority-1 (160) of port-7 (154). Mapping module 108 maps this port to agent-4 (130) which is not requesting access to the resource group 104. Because agent-4 (130) is not requesting access, it is not allocated access. The arbitration module 106 instead considers the next highest priority port provided by priority ranking module 114 as priority-2 (162) of port-n (156) which has been mapped by mapping module 108 to agent-m (132). Agent-m (132) is also not currently requesting access to the resource group 104, so the arbitration module 106 next considers the next highest priority port of priority-3 (164) of port-5 (150) which is mapped to agent-3 (128). Agent-3 (128) is requesting access so it is allocated access to the resource group 104 by arbitration module 106.

The resource group 104 includes at least one resource. An example of the resource group is a computer bus. The computer bus may have multiple agents, such as several processors, a memory controller, and an I/O controller that may need to issue transactions on the computer bus. Assume for purposes of example that performance studies have determined that system performance is optimized when each processor is allocated one share of access to the computer bus, the memory controller is allocated three shares, and the I/O controller is allocated two shares. An embodiment of the invention permits access to the computer bus to be weighted in such a manner to optimize system performance. It will be appreciated that arbitration weighting is not necessarily the same as utilization weighting. For the computer bus there may be transactions of various lengths. An agent with a low arbitration weighting that issues only long transactions on the bus may utilize more bus cycles than an agent with a high arbitration weighting that issues only short transactions.

The resource group 104 may represent other resources, such as a cache control pipeline. For example, the agents sharing access to the cache control pipeline may include two front side busses and a memory controller. Memory read operations issued from processors and I/O controllers on either of the front side busses are entered into the cache control pipeline to check whether the memory read can be completed by way of the cache instead of by slower memory. Memory read operations in the cache control pipeline may spawn speculative memory reads by the cache control pipeline. Memory write operations issued from processors and I/O controllers on either of the front side busses are entered into the cache control pipeline to check whether stale data must be evicted from the cache upon writing the data to memory. Data responses from the memory controller for speculative memory reads are entered into the cache control pipeline to write the data returned into cache. The cache control pipeline may have several pipeline stages. The first stage may involve a tag read stage where the cache tag is read and checked for a matching hit with the address of the transaction. The second stage may be a data access stage. For memory read operations resulting in a cache hit, the data is read from the cache in the data access stage. For data responses for speculative memory reads from the memory controller, the data response is written into the cache in the data access stage. The third pipeline stage may be a tag access stage where either the tag is written for data responses or evictions, or the tag is read at the location for a speculative read. In the forth and last pipeline stage, any speculative read is issued. There can be up to four distinct transactions in such an exemplary cache control pipeline at any moment. Arbitration for access to the cache control pipeline involves arbitration for entry into the pipeline at the first stage. Allocation of entry into the first stage of the pipeline inherently allocates access to later stages of the pipeline at later time steps. Each of the stages of the pipeline can be considered a resource, and collectively the stages form a resource group 104. Therefore, arbitrating for access to such a cache control pipeline may involve arbitrating for a resource group 104.

The agents 102 are shown with each having a direct connection to the resource group 104 as is often the case for a computer bus. For a pipeline such as a cache control pipeline, the agents may instead access the pipeline through a selector that is steered to allow the selected agent to supply the transaction to enter the pipeline. Some pipelines may temporarily block the acceptance of new transactions. It will be appreciated that such blockage temporarily suspends arbitration for the pipeline by the arbitration module 106.

Figure 3:
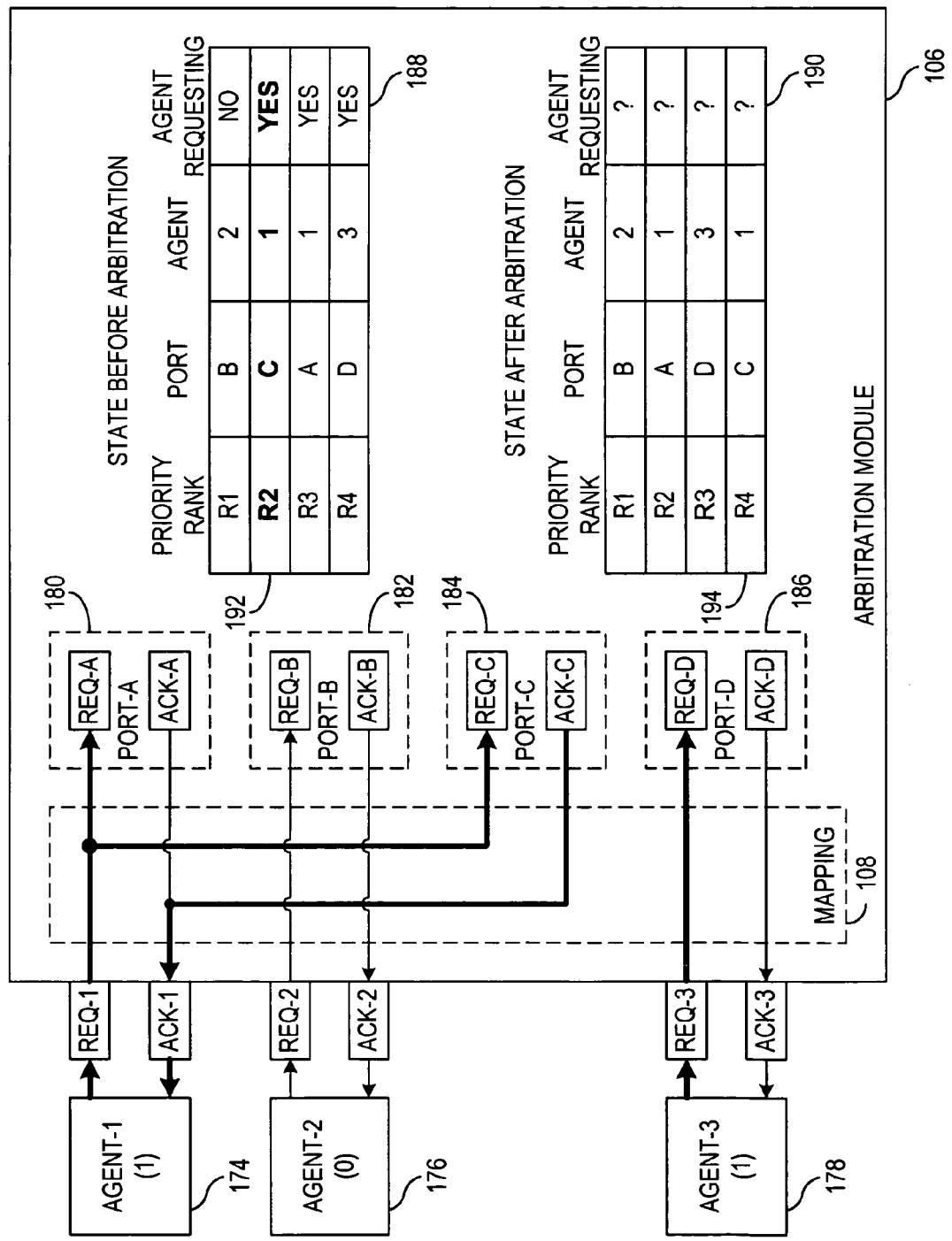
FIG. 3 is a block diagram of an arbitration module with the selected agent being mapped to more than one port in accordance with various embodiments of the invention.

FIG. 3 shows an embodiment of the arbitration module 106 where one of the agents is mapped to two ports, and this agent is selected by the arbitration module 106. The mapping module 108 maps the agents 174, 176, and 178 to the arbitration ports 180, 182, 184, and 186. Table 188 shows the state of the arbitration module 106 before arbitration and table 190 shows the state of the arbitration module 106 after arbitration.

The mapping module 108 maps agent-1 (174) to two ports port-a (180) and port-c (184), agent-2 (176) maps to port-b (182), and agent-3 (178) maps to port-d (186). A request and an acknowledge signal are associated with each agent 174, 176, 178 and each port 180, 182, 184, and 186. Agent-1 (174) is requesting access on its request signal and this access request is mapped to both port-a (180) and port-c (184). Agent-2 (176) is not requesting access, so port-b (182) is not requesting access. Agent-3 (178) is requesting access, so port-d (186) is requesting access. Table 188 shows that the top ranking port is port-b (182), mapped to agent-2 (176) which is not requesting access. So access is not allocated to port-b (182) and agent-2 (176). The next highest ranking port at priority rank 2 is port-c (184), mapped to agent-1 (174) which is requesting access. So access is allocated to port-c (184) and agent-1 (174) as communicated over the acknowledgement signals of port-c (184) and agent-1 (174).

After allocating access to agent-1 (174) via port-c (184), the state before arbitration shown in table 188 is modified to yield the state after arbitration shown in table 190. The row of the port selected by the arbitration module 106, port-c (184), is row 192 in table 188. The rows of table 188 above selection row 192 are unmodified in table 190. Selection row 192 of table 188 is moved to the lowest priority rank of row 194 in table 190. The rows of table 188 below selection row 192 are moved up one priority rank in table 190. From table 190 note for the next arbitration that if agent-1 (174) and agent-3 (178) are still the only agents requesting access then access is again allocated to agent-1 (174) via port-a (180). This illustrates that mapping module agent-1 (174) to two ports 180 and 184 results in agent-1 receiving an arbitration weighting of two. While agent-1 (174) and agent-3 (178) remain the only agents continuously requesting access, agent-1 (174) is allocated two accesses for every one access allocated to agent-3 (178).

While individual arbitration acknowledge signals are shown for each agent 174, 176, 178, it will be appreciated that a single arbitration acknowledge bus encoding an identifier for the selected agent is an equivalent means of providing the function of arbitration acknowledge.

Figure 4:
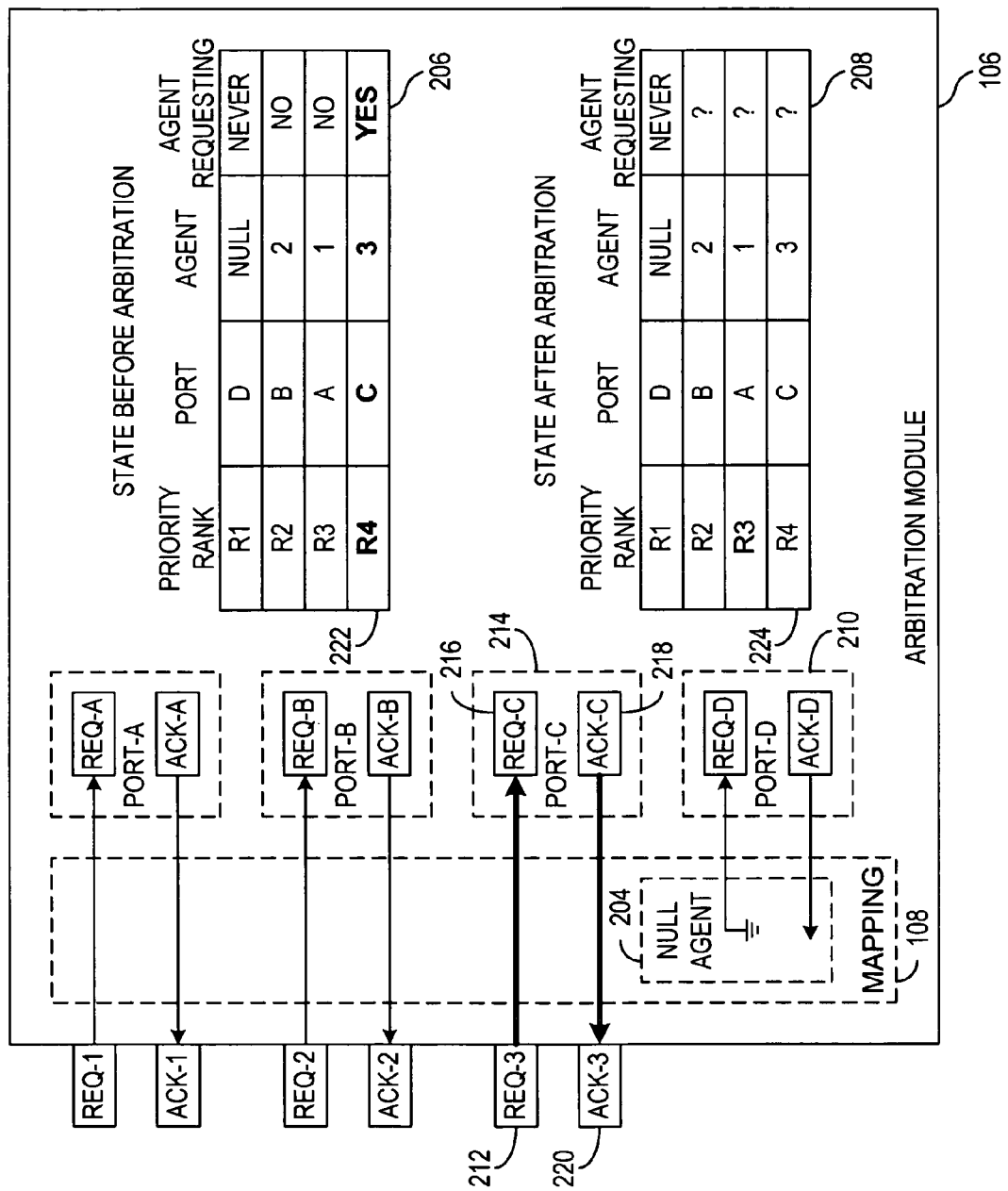
FIG. 4 is a block diagram of an arbitration module with a null agent in accordance with various embodiments of the invention.

FIG. 4 shows an embodiment of the arbitration module 106 illustrating a mapping module 108 with a null agent 204. Table 206 shows the state before arbitration of the arbitration module 106 and table 208 shows the state after arbitration of the arbitration module 106. The null agent 204 is an agent that never requests access to the resource group and is usually internal to the arbitration module 106. It will be appreciated that an agent external to the arbitration module 106 may be a null agent. An internal null agent 204 is created by a mapping module 108 that maps no external agent to one or more of the ports. Port-d (210) is mapped by mapping module 108 to no external agents so port-d (210) is mapped to the null agent 204, so requests for access are never made via port-d (210). In this example only agent-3 is requesting access via request signal req-3 (212) mapped to port-c (214), so only port-c (214) is requesting access via request signal req-c (216). From table 206 the highest priority ranking port requesting access is the only port requesting access of port-c (214) at priority rank 4. So port-c (214) and mapped agent-3 is allocated access as communicated via signals ack-c (218) and ack-3 (220). The state before arbitration of the arbitration module 106 shown in table 206 is modified after allocation to yield the state after arbitration shown in table 208. The selection row 222 of port-c (214) which is allocated access is moved to the lowest priority row 224—the same row—and the rows above the selection row 222 are not modified.

In one embodiment the mapping module 108 is programmable to allow system performance to be improved after manufacture. The null agent 204 increases the flexibility of a programmable mapping module 108. For an arbitration module with 3 agents and 4 arbitration ports that did not allow a null agent, one of the agents must be assigned a weight of 2 while the remaining agents should be assigned a weight of 1. The arbitration module 106 allowing the null agent 204 permits an additional weighting possibility of all agents assigned a weight of 1 as shown.

Figure 5:
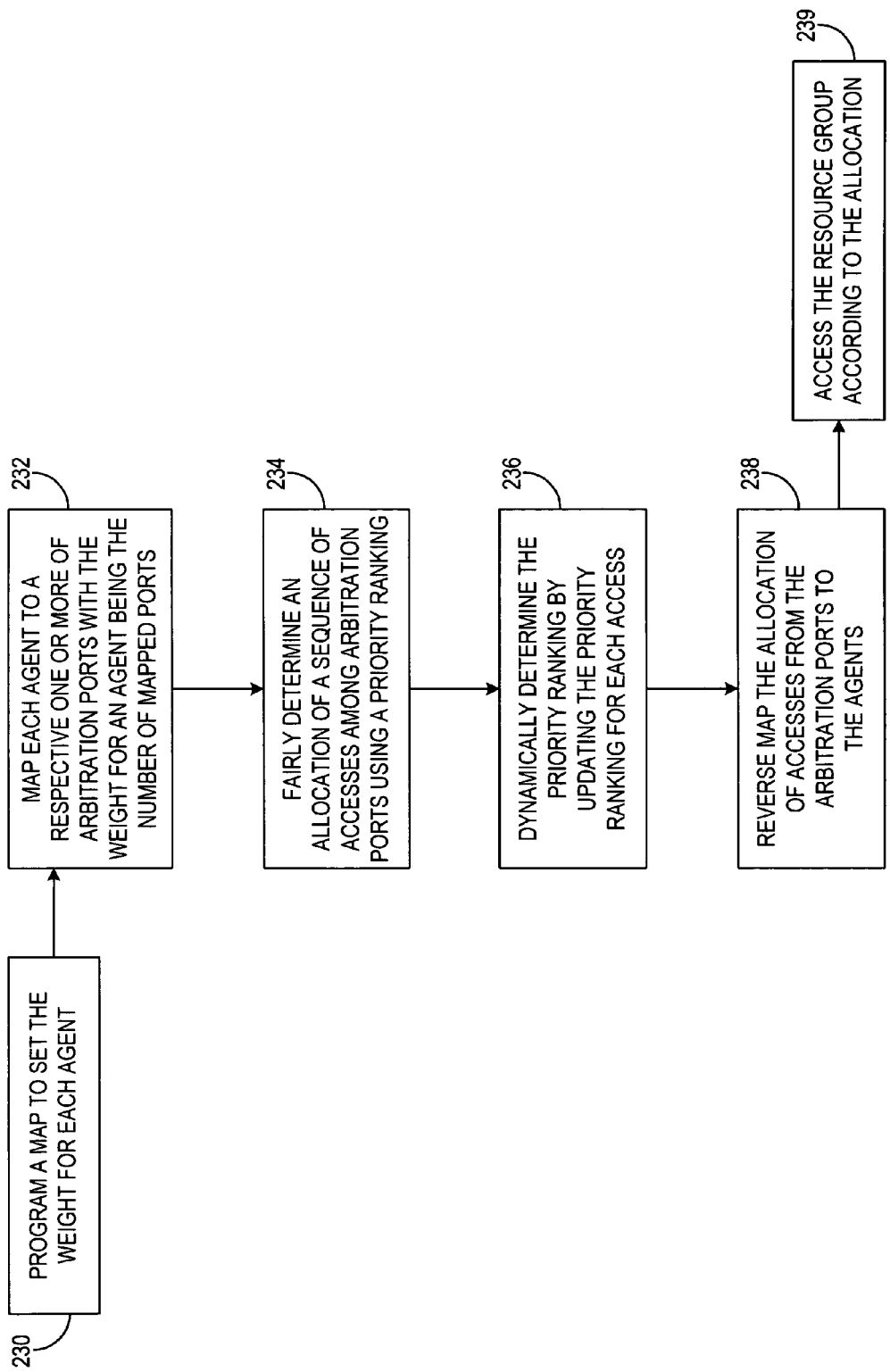
FIG. 5 is a flow chart of a process for allocating a sequence of accesses to a resource group in accordance with various embodiments of the invention.

FIG. 5 is a flow chart of a process for allocating a sequence of accesses to a resource group in accordance with various embodiments of the invention. At step 230, a programmable map that maps agents to arbitration ports is programmed. The programming of the map sets the respective weight for each agent, with the weight for each agent being the number of ports to which the agent is mapped. At step 232, each agent is mapped to a respective one or more of the ports according to the programmable map. At step 234, a priority ranking of the arbitration ports is used to fairly determine an allocation of the sequence of accesses among the arbitration ports. The priority ranking may assign one of the rank values from 1 to n to each of the ports where n is the number of ports. At step 236, the priority ranking is dynamically updated for each access. The priority ranking may be updated for an access by moving the port allocated access to the lowest priority. At step 238, the allocation of the sequence of access is mapped back to the agents according to the programmable map. For an access allocated to a particular port, the access is allocated to the agent that is mapped to the particular port. At step 239, the resource group is accessed according to the allocation of the sequence of accesses.

Figure 6:
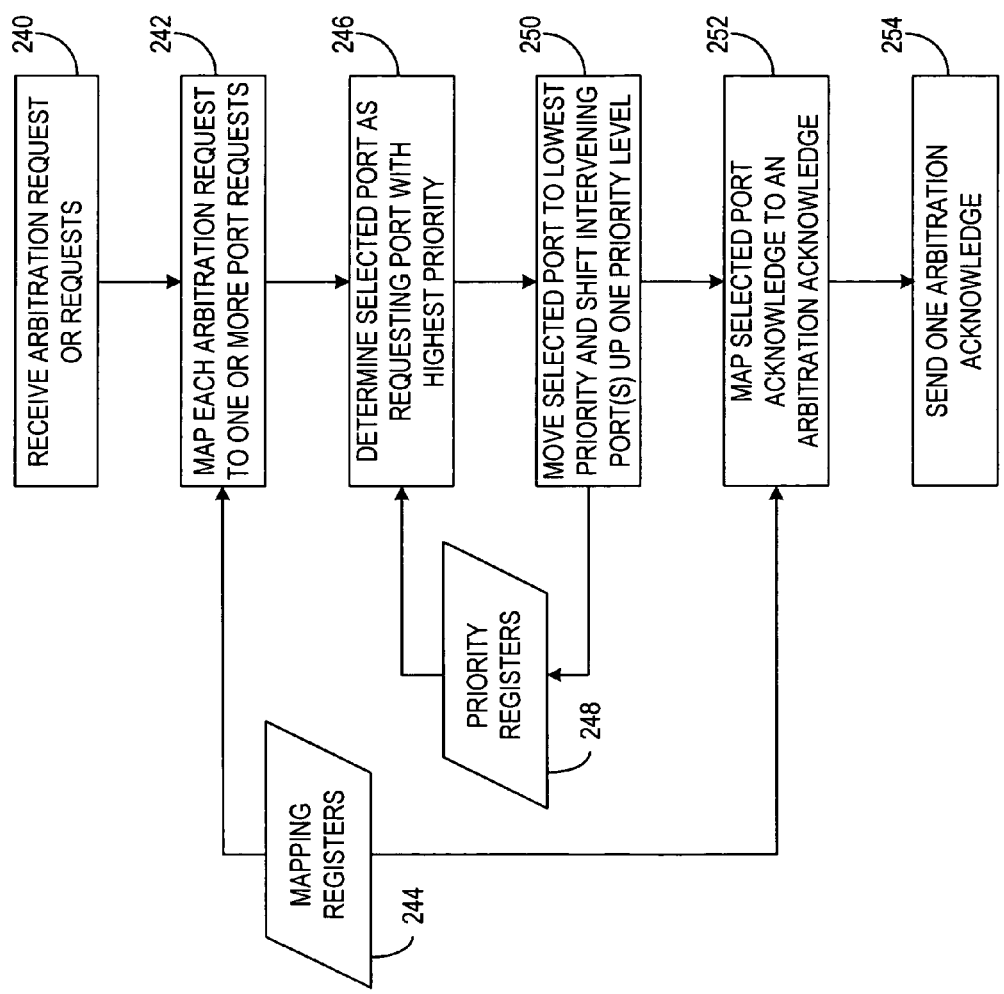
FIG. 6 is a flow chart illustrating mapping and prioritization in accordance with various embodiments of the invention.

FIG. 6 shows the flow chart of an embodiment of a process for the invention. At step 240, the agents collectively provide zero or more arbitration requests. If no agent makes an arbitration request then access is not allocated to the resource group. At step 242, each arbitration request from an agent is mapped to one or more port requests according to the weighting assigned to the agent. The values of the mapping registers 244 may be used to determine the mapping of arbitration requests to port requests, and hence the weighting. At step 246, the requesting port with the highest priority rank is selected by and a port acknowledge is generated for that port. The priority ranks of each port may be provided by the priority registers 248. At step 250, the selected port is moved to the lowest priority rank in the priority registers 248, the ports with priority rank above the rank of the selected port, if any, are not modified in the priority registers 248, the ports with priority rank below rank of the selected port, if any, are moved up one priority level in the priority registers 248. At step 252, the port acknowledge for the port selected in step 246 is mapped back to an arbitration acknowledge. At step 254, the arbitration acknowledge is sent to the appropriate agent to allocate access to the resource group to that agent.

Figure 7:
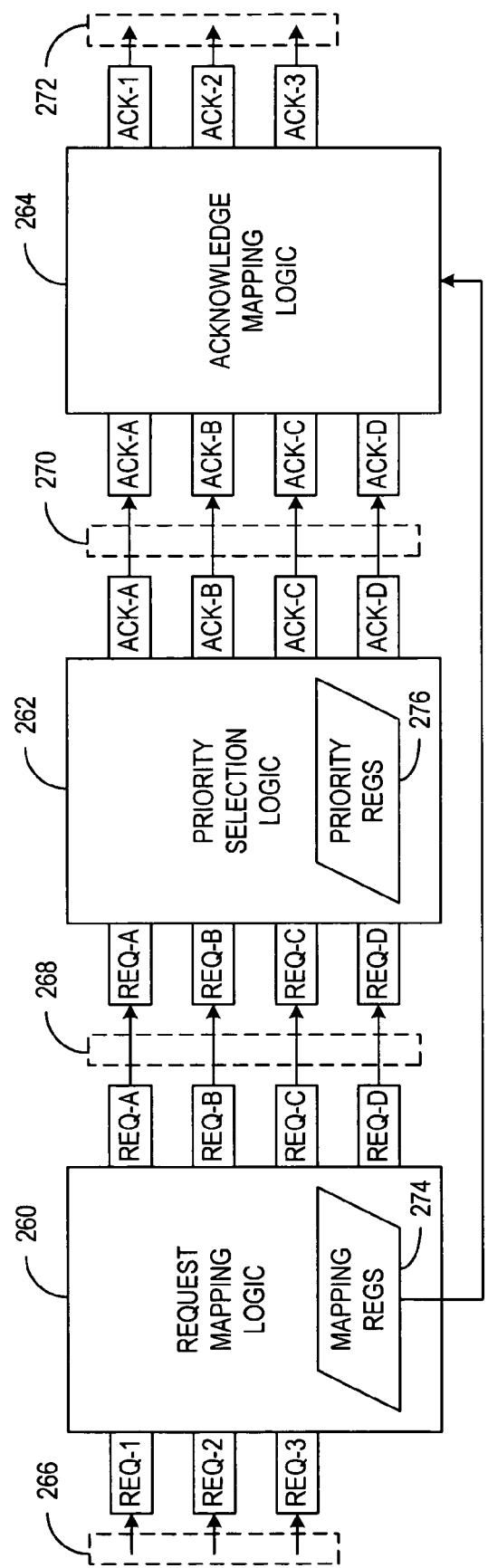
FIG. 7 is a block diagram of an arbitration module in accordance with various embodiments of the invention.

FIG. 7 is a top level schematic diagram of an embodiment of the invention. The top level schematic diagram includes the request mapping logic 260, the priority selection logic 262, and the acknowledge mapping logic 264. The request mapping logic 260 maps arbitration requests 266 from agents to port requests 268. The priority selection logic 262 selects the one of the port requests 268 with highest priority to acknowledge with a port acknowledge 270. The acknowledge mapping logic 264 maps the port acknowledge 270 to an arbitration acknowledge 272 for an agent, and that agent is allocated access to the resource group. The mapping registers 274 may control the mapping between agents and ports for both the mapping of requests by the request mapping logic 260 and the mapping of acknowledges by the acknowledge mapping logic 264. The mapping registers 274 are shown internal to the request mapping logic 260, although they may be located elsewhere. It will be appreciated that separate mapping registers may be provided for the request mapping logic 260 and the acknowledge mapping logic 264 having values that are kept consistent with an overall mapping between agents and ports. The priority selection logic 262 may use the priority registers 276 to determine the selected port.

Figure 8:
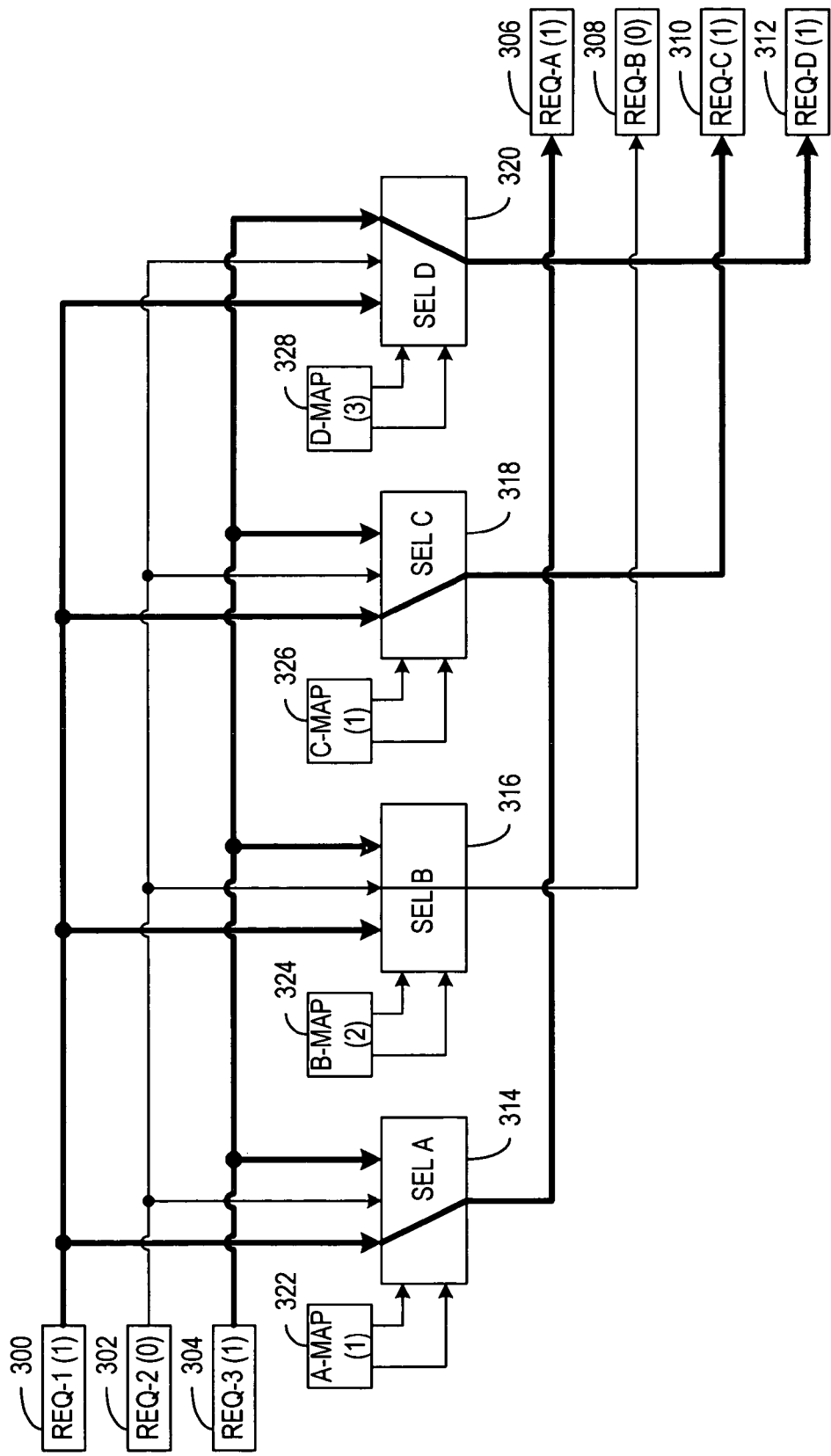
FIG. 8 is a block diagram of request mapping logic of an arbitration module in accordance with various embodiments of the invention.

FIG. 8 shows an embodiment of the request mapping logic. The request mapping logic maps arbitration requests req-1 (300), req-2 (302), and req-3 (304) from agents to port requests req-a (306), req-b (308), req-c (310), and req-d (312). There is a respective selector for each port sel-a (314), sel-b (316), sel-c (318), and sel-d (320) controlled respectively by mapping registers a-map 322, b-map 324, c-map 326, and d-map 328. The registers a-map 322 and c-map 326 both contain the selector value of '1' for arbitration request req-1 (300) so this arbitration request is mapped to both req-a (306) and req-c (310). Because agent-1 is requesting access with a req-1 (300) value of '1', both req-a (306) and req-c (310) are given active port requests with a value of '1'. Arbitration request req-2 (302) is mapped to port request req-b (308) by selection sel-b (316) because mapping register b-map 324 contains the value '2' for req-2 (302). Because agent-2 is not requesting access with a req-2 (302) value of '0', req-b (308) has an inactive port request with a value of '0'. Arbitration request req-3 304 is mapped to port request req-d (312) by selection sel-d (320) because mapping register d-map 328 contains the value '3' for req-3 (304). Because agent-3 is requesting access with a req-3 (304) value of '1', req-d (312) has an active port request with a value of '1'.

It will be appreciated that the selectors 314, 316, 318, and 320 may use the value of '0' from the respective mapping register 322, 324, 326, and 328 to specify using the null agent for the respective port request 306, 308, 310, and 312.

Figure 9:
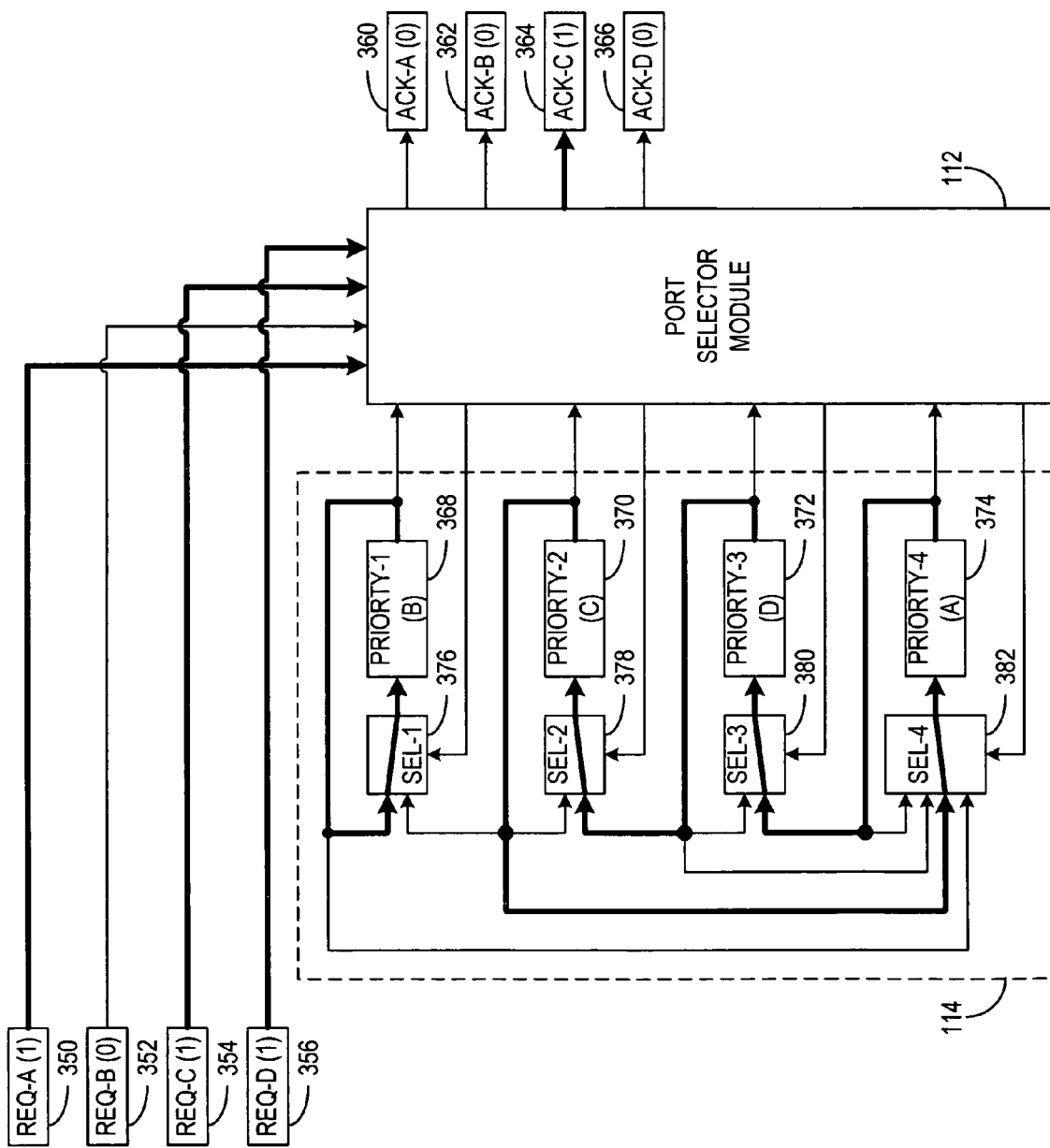
FIG. 9 is a block diagram of priority selection logic of an arbitration module in accordance with various embodiments of the invention.

FIG. 9 shows an embodiment of the priority selection logic including port selector module 112 and priority ranking module 114. Port requests req-a (350), req-b (352), req-c (354), and req-d (356) from the request mapping logic are input into the port selector module 112 which generates port acknowledges ack-a (360), ack-b (362), ack-c (364), and ack-d (366). Port selector module 112 uses the priority values in priority registers priority-1 (368), priority-2 (370), priority-3 (372), and priority-4 (374) to determine which of the active requests have priority. The port selector module 112 first checks priority register priority-1 (368) containing the value of 'b' indicating that req-b (352) from port-b has the top priority rank of one. The port selector module 112 determines that req-b (352) is not active with a value of '0', so port-b is not selected with ack-b (362) given the value of '0'. The port selector module 112 next checks priority register priority-2 (370) containing the value of 'c' indicating that req-c (354) from port-c has the next highest priority rank of two. The port selector module 112 determines that req-c (354) is active with a value of '1', so port-c is selected with ack-c (364) given the value of '1'. The remaining active requests of req-a (350) and req-d (356) are ignored at this time and ack-a (360) and ack-d (36)6 are each given a value of '0'.

The priority ranking module 114 comprises the priority registers priority-1 (368), priority-2 (370), priority-3 (372), and priority-4 (374) and the selectors sel-1 (376), sel-2 (378), sel-3 (380), and sel-4 (382). The port selector module 112 steers the selectors sel-1 (376), sel-2 (378), sel-3 (380), and sel-4 (382) to update priority register values in priority-1 (368), priority-2 (370), priority-3 (372), and priority-4 (374). Because the selected port was at priority rank two, the priority registers above rank two should not be modified, so sel-1 (376) is steered to re-circulate the value of priority-1 (368). Because the priority registers below rank two should move up one priority level, sel-2 (378) is steered to move the value from priority-3 (372) to priority-2 (370) and sel-3 (380) is steered to move the value from priority-4 (374) to priority-3 (372). Because the priority register at rank two should be moved to the lowest priority rank of four, sel-4 (382) is steered to move the value from priority-2 (370) to priority-4 (374).

This embodiment shows a register 368, 370, 372, and 374 for each priority level with the value contained in each register being a port identifier. It will be appreciated that an equivalent function may be obtained by an embodiment having a register for each port with the value contained in each register being the priority rank for the port.

Figure 10:
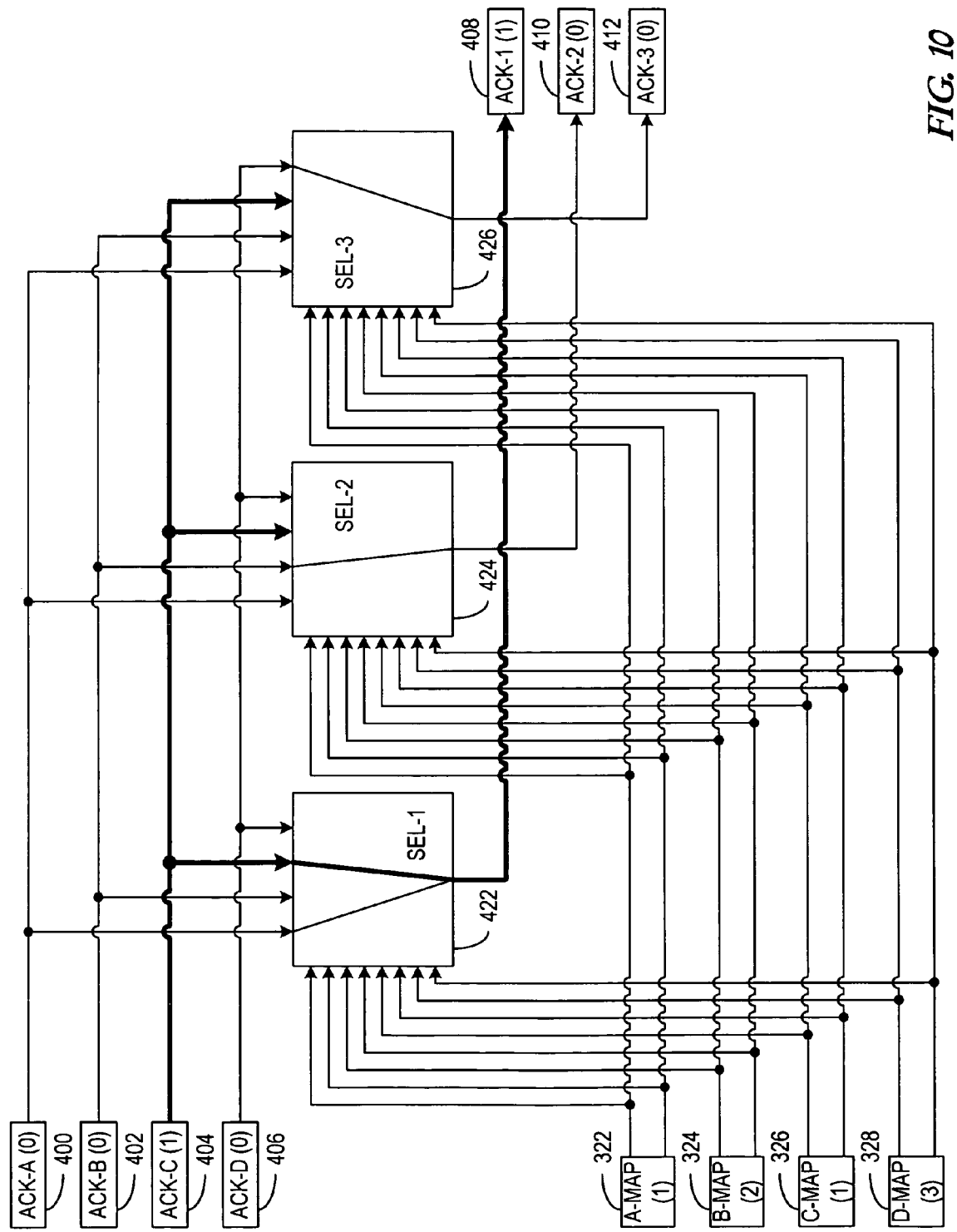
FIG. 10 is a schematic diagram of acknowledgement mapping logic of an arbitration module in accordance with various embodiments of the invention.

FIG. 10 shows an embodiment of the acknowledgement mapping logic. The port acknowledges ack-a (400), ack-b (402), ack-c (404), and ack-d (406) from the priority selection logic are inputs to the acknowledgment mapping logic and the outputs are the arbitration acknowledgements ack-1 (408), ack-2 (410), and ack-3 (412). The acknowledgement mapping logic may use the values of the request mapping registers a-map 322, b-map 324, c-map 326 and d-map 328 input from the request mapping logic to steer the selectors sel-1 (422), sel-2 (424) and sel-3 (426). Using the request mapping registers to control the acknowledgement mapping has the advantage that the request mapping and acknowledgement mapping are consistent with each other. The selectors sel-1 (422), sel-2 (424) and sel-3 (426) should not be multiplexers. Because the selector sel-1 (422) has two mapping register inputs with value '1', a-map 322 and c-map 326, selector sel-1 (422) generates an active ack-1 (408) when either ack-a (400) or ack-c (404) are active. In this example, only ack-c (404) is active with a value of '1' so ack-1 (408) is given a value of '1' by selector sel-1 (422). Generally, only one active port acknowledgement is generated by the priority selection logic. The remaining selectors, sel-2 (424) and sel-3 (426) respectively steer the remaining inactive port acknowledgements ack-b (402) and ack-d (406) to the remaining arbitration acknowledgements ack-2 (410) and ack-3 (412). It will be appreciated that when a null agent is mapped by the request mapping to a particular request port, the corresponding port acknowledge is not steered by any of the selectors in the acknowledgement mapping logic.

Figure 11:
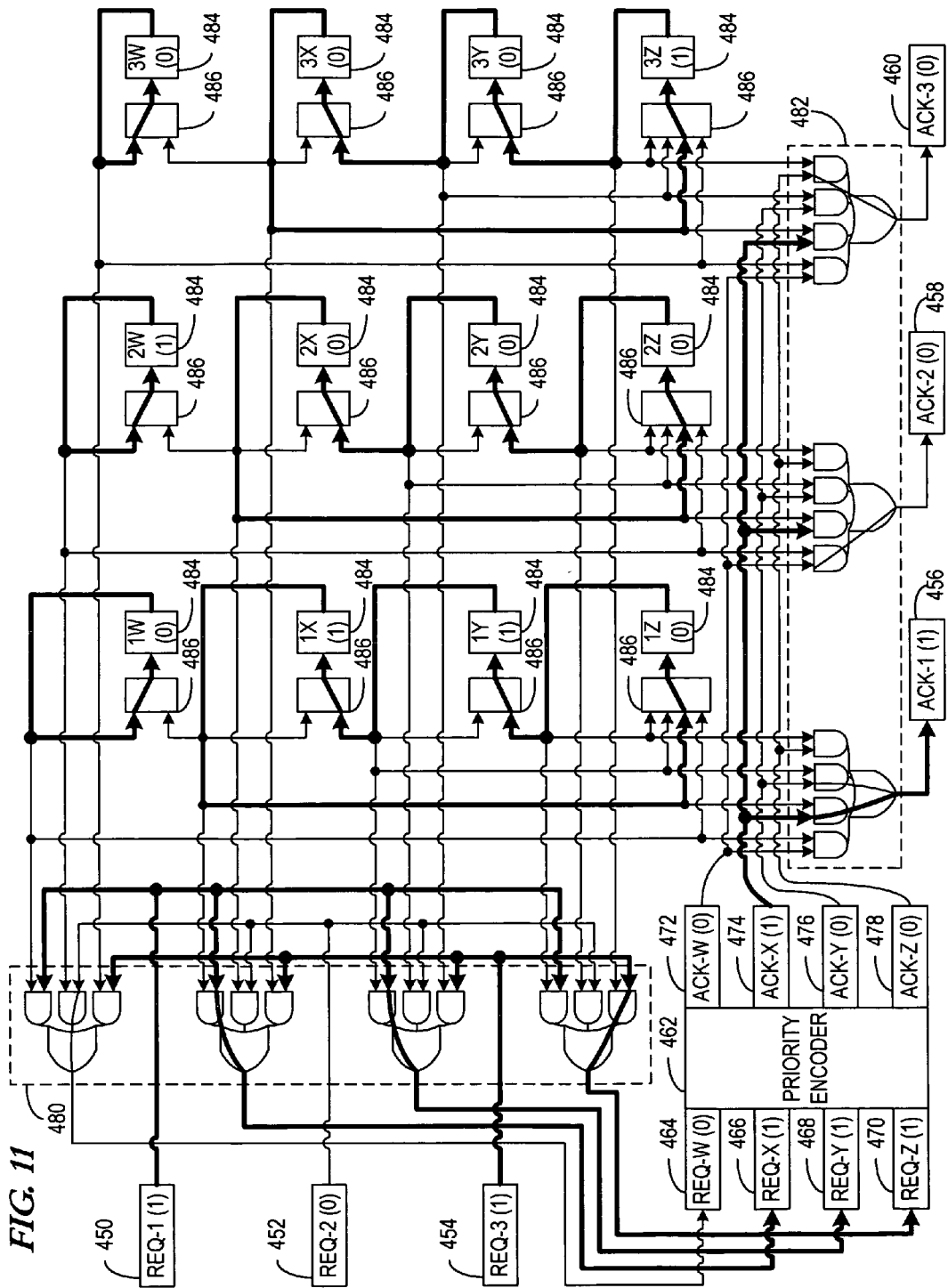
FIG. 11 is a schematic diagram of an alternative arbitration module merging the logic for mapping and priority selection in accordance with various embodiments of the invention.

FIG. 11 shows is a schematic diagram of an alternative embodiment of the arbitration module that merges the logic for mapping and priority selection. The arbitration requests req-1 (450), req-2 (452) and req-3 (454) are inputs and the arbitration acknowledgements ack-1 (456), ack-2 (458) and ack-3 (460) are outputs. A priority encoder 462 is used for priority selection. In contrast to previously discussed priority selection logic, priority encoder 462 has port request inputs req-w (464), req-x (466), req-y (468), and req-z (470) that have fixed priority ranks, such that req-w (464) is always the highest priority port request input at rank one, req-w (466) is the rank two input, req-y (468) is the rank three input, and req-z (470) is the rank four input. The priority encoder 462 generates the port acknowledgements ack-w (472), ack-x (474), ack-y (476), and ack-z (478). The active port acknowledgement generated by the priority encoder 462 corresponds to the highest priority port request, if any. In this example, req-w (464) is not active so ack-w (472) is given an inactive value of '0' by the priority encoder 462. In this example, req-x (466) is active so ack-x (474) is given an active value of '1' by the priority encoder 462. The remaining port requests req-y (468), req-z (470) are ignored by the priority encoder 462 at this time and the remaining port acknowledgements ack-y (476) and ack-z (478) are hence given an inactive value by the priority encoder 462.

The AND/OR gates 480 are request mapping selectors and the AND/OR gates 482 are acknowledgement mapping selectors. The mappings by the AND/OR gates 480 and AND/OR gates 482 is controlled by the mapping/priority registers 484. Each of the mapping/priority registers 484 stores one control bit. The mapping/priority registers 484 are arranged in a logical array of rows and columns. Each row of the mapping/priority registers 484 controls the steering of a respective request mapping selector 480. Each row of the mapping/priority registers 484 corresponds roughly to one of the previously discussed request mapping registers, but with decoded values. The decoded values in the mapping/priority registers 484 often have exactly one active bit in each row, but may instead have no active bits when a null agent is mapped to the port request of that row. Each column of the mapping/priority registers 484 controls the steering of a respective acknowledgement mapping selector 482. A column of the mapping/priority registers 484 does contain more than one active bit for an arbitration acknowledgment selector 482 corresponding to an agent that is mapped to multiple ports.

The rows of the mapping/priority registers 484 also correspond roughly to the previously discussed priority registers. Each row of the mapping/priority registers 484 corresponds to an absolute priority rank with the top rank one being the top row. In this example arbitration request req-1 (450) is active and is mapped to the rank two port request of req-x (466) by row two of the mapping/priority registers 484. Because req-x (466) at rank two is selected by the priority encoder 462, the mapping/priority registers 484 are updated by not modifying the values of the rows above row two, moving the values of the rows below row two up one row, and by moving the values of row two to the bottom row. The movement of values for the mapping/priority registers 484 is performed by a respective selector 486 in front of each mapping/priority register 484. The selectors 486 are controlled by logic in the priority encoder 462 with the control paths not shown.

Figure 12:
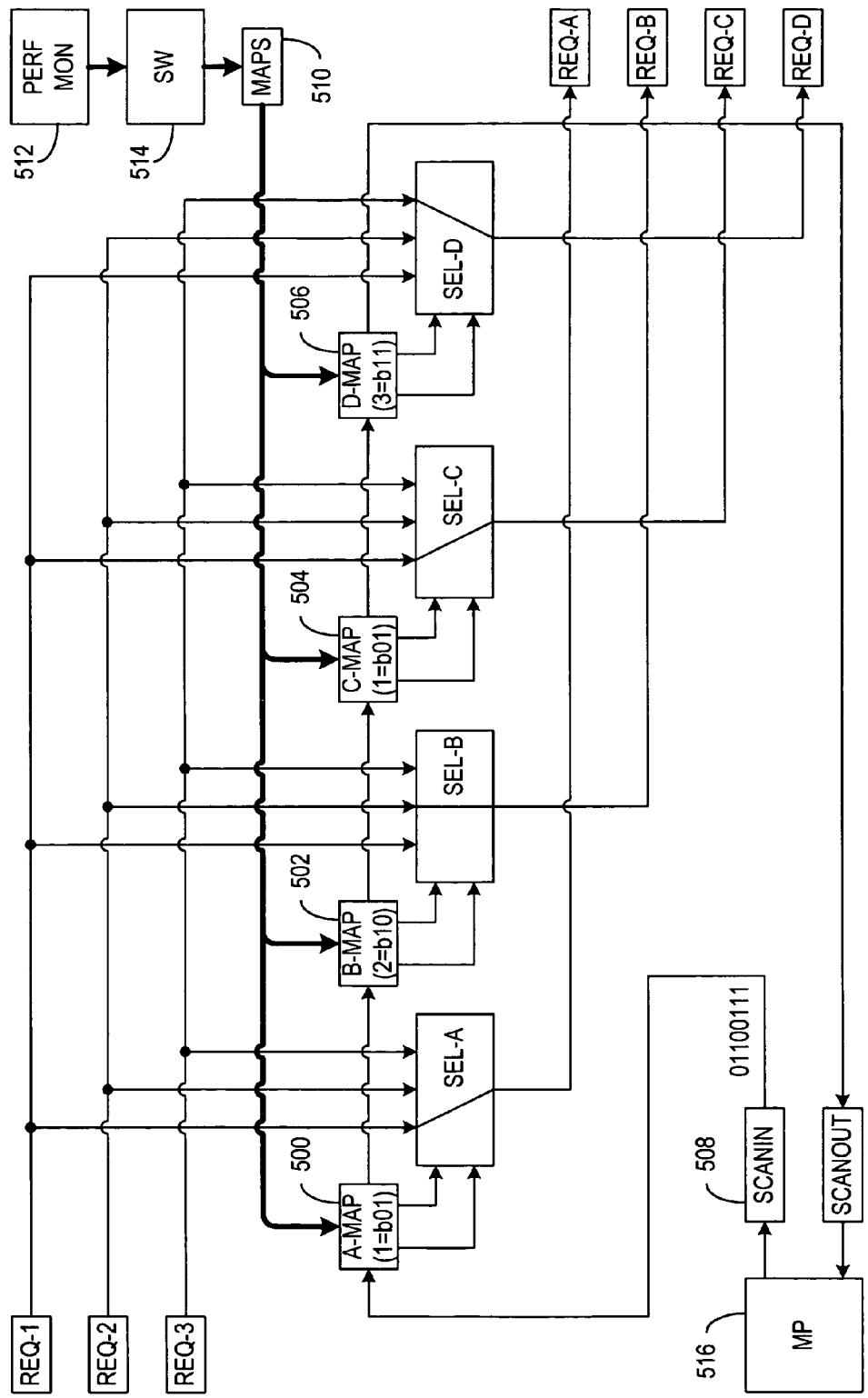
FIG. 12 is a schematic diagram showing programming paths for the request mapping logic in accordance with various embodiments of the invention.

FIG. 12 is shows a schematic diagram of an alternative embodiment of the request mapping logic illustrating the programming paths for the request mapping logic. In this embodiment, the mapping registers a-map 500, b-map 502, c-map 504, and d-map 506 can have programmed values. These programmed values may be set statically upon system power-up or the values may be dynamically determined during system operation.

A programmable value for the mapping allows the arbitration weight of each agent to be modified. The arbitration weights of each agent may be modified for reasons such as improving system performance. It may be known that the transaction mix for one customer of a system is optimized by a particular weighting while the transaction mix for another customer of the same system is optimized by a different weighting. The performance optimizing weights for each customer may be established by statically programming the mapping register values on system power-up. For another embodiment characteristics of the transaction mix may be dynamically measured by performance monitor 512 and operating system software 514, or some other performance measurement technique may be used to dynamically modify the arbitration weight of each agent by programming the values of the mapping registers 500, 502, 504, and 506.

Statically programmed values may be set by a serial scan that is performed upon system power-up by maintenance processor 516. The serial scan shifts data from the scan-in input 508 through a scan chain of each of the mapping registers a-map 500, b-map 502, c-map 504, and d-map 506. It will be appreciated that the individual bits of the mapping registers may occur in any order in the scan chain and that these bits may be mixed with bits from other scannable registers. In addition, dynamically programmed values may be set by a parallel load into mapping registers a-map 500, b-map 502, c-map 504, and d-map 506 from the maps bus input 510. It will be appreciated that either path of serial scan from scan-in 508 or parallel load from the maps bus 510 may be used to set up either statically or dynamically programmed values for the mapping registers a-map 500, b-map 502, c-map 504, and d-map 506.

The foregoing description of the exemplary embodiment of the invention has been presented for the purposes of illustration and description. It is not intended to be exhaustive or to limit the invention to the precise form disclosed. Many modifications and variations are possible in light of the above teaching. For example arbitration for a resource group of a cache control pipeline with 5 agents mapped to 8 ports where the agents comprise 2 Intel front side buses and a memory controller and where the mapping is statically programmable by serial scan on power-up to optimize performance for the transaction mix of the customer. It is intended that the scope of the invention be limited not with this detailed description, but rather defined by the claims appended hereto.

What is claimed is:

1. An apparatus for arbitrating for access to a resource group between a plurality of agents, comprising:
   a programmable mapping module that, for each of the agents, selectively couples a respective arbitration handshake signal of the agent to one or more of a plurality of arbitration ports responsive to a respective programmable weight for the agent, wherein the one or more arbitration ports to which the agent is coupled corresponds in number to the respective programmable weight;
   a selection module coupled to the arbitration ports of the mapping module, wherein the selection module selects one of the arbitration ports in response to a priority ranking of the arbitration ports, and one of the agents having the respective arbitration handshake signal that is selectively coupled by the programmable mapping module to the selected one of the arbitration ports is granted access to the resource group; and
   a ranking module coupled to the selection module, wherein the ranking module provides the priority ranking of the arbitration ports and updates the priority ranking in response to the selection module selecting the one of the arbitration ports.

2. The apparatus of claim 1, wherein the arbitration ports are greater in number than the agents are in number.

3. The apparatus of claim 1, wherein the resource group is a pipeline that executes a sequence that includes a plurality of transactions, and for each transaction, the selection module selects one of the arbitration ports, and one of the agents coupled to the selected one of the arbitration ports is granted access to issue the transaction to the pipeline.

4. The apparatus of claim 1, wherein the programmable mapping module is programmable to selectively couple the respective arbitration handshake signal of each agent to each of the arbitration ports.

5. The apparatus of claim 1, wherein the programmable mapping module includes a request-mapping module and an acknowledgement-mapping module, the request-mapping module configured to map the respective request for each of the agents to a request of each of the at least one of the arbitration ports for the agent, and the acknowledgement-mapping module configured to map the respective acknowledgement signal for each of the agents from a combination of an acknowledgement signal from each of the at least one of the arbitration ports for the agent.

6. The apparatus of claim 1, wherein each of the arbitration ports indicates whether the arbitration port is requesting access to the resource group, and, in response to at least one of the arbitration ports requesting access to the resource group, the selection module selects the one of the arbitration ports that is highest in the priority ranking among the at least one of the arbitration ports that is requesting access to the resource group.

7. The apparatus of claim 1, wherein each of the arbitration ports indicates whether the arbitration port is granting access to the resource group, and the selection module indicates the one of the arbitration ports is granting access to the resource group and each arbitration port other than the one of the arbitration ports is not granting access to the resource group.

8. The apparatus of claim 1, wherein the ranking module updates the priority ranking of the arbitration ports and assigns a lowest priority ranking to the selected one of the arbitration ports.

9. A method for programmable allocation of a sequence including a plurality of accesses to a resource group among a plurality of agents, comprising: PARA2mapping each agent to at least one of a plurality of arbitration ports according to a programmable map that includes a respective programmable weight for each agent, wherein the one or more arbitration ports to which the agent is mapped corresponds in number to the respective programmable weight, and the arbitration ports are greater in number than the agents are in number; PARA2determining an allocation of the sequence of the accesses to the resource group among the arbitration ports using a priority ranking of the arbitration ports; PARA2dynamically determining the priority ranking of the arbitration ports, and updating the priority ranking for each of the accesses to the resource group of the sequence; and PARA2reverse mapping the allocation of the sequence of the accesses from the arbitration ports to the agents according to the programmable map.

10. The method of claim 9, further comprising accessing the resource group by the agents as specified by the reverse mapping of the allocation of the sequence of the accesses from the arbitration ports to the agents.

11. The method of claim 10, wherein the resource group is a pipeline and the accessing the resource group includes, for each access of the sequence, issuing a transaction to the pipeline by one of the agents specified by the reverse mapping of an arbitration port of the access for the allocation.

12. The method of claim 9, wherein the mapping each agent to at least one of the arbitration ports according to the programmable map includes mapping a null requester that never requests access to the resource group to at least one of the arbitration ports.

13. The method of claim 9, wherein the mapping includes mapping a respective request for access to the resource group from each agent to a corresponding request for access to the resource group for each of the at least one of the arbitration ports, and the determining the allocation of the sequence of the accesses to the resource group includes allocating equal portions of the sequence of the accesses to each of the arbitration ports requesting access to the resource group.

14. The method of claim 13, wherein the equal portions of the sequence of the accesses are equal numbers of the accesses of the sequence, with each access of the sequence having a duration of accessing the resource group that is dependent on a type of the access.

15. The method of claim 13, wherein the determining the allocation of the sequence of the accesses to the resource group further includes successively allocating each access of the sequence to one of the arbitration ports that is highest in the priority ranking among all of the arbitration ports requesting access to the resource group, and the dynamically determining the priority ranking of the arbitration ports includes updating the priority ranking to make the one of the arbitration ports have the lowest priority in the priority ranking.

16. The method of claim 15, wherein, for each access of the sequence, the reverse mapping of the one of the arbitration ports specifies a corresponding one of the agents having the access to the resource group and in response the one of the agents updates the respective request for access to the resource group.

17. The method of claim 9, further comprising programming the programmable map and thereby setting the respective programmable weight for each agent.

18. The method of claim 17, wherein the programming the programmable map is done one of statically for an expected behavior of the sequence of the accesses to the resource group and dynamically in response to a measured behavior from a performance analyzer of the sequence of the accesses to the resource group.

19. The method of claim 17, wherein the programming the programmable map includes setting the respective programmable weight for each agent by a maintenance processor using scan registers.

20. The method of claim 17, wherein the programming the programmable map includes setting the respective programmable weight for each agent by software executing on a system that includes the resource group.

21. The method of claim 9, wherein the dynamically determining the priority ranking of the arbitration ports includes maintaining a register for each of a plurality of priority levels, each register storing a respective number of one of the arbitration ports having a corresponding one the priority levels.

22. The method of claim 9, wherein the dynamically determining the priority ranking of the arbitration ports includes maintaining a register for each of the arbitration ports, each register storing a respective one of a plurality of priority levels for the corresponding arbitration port.

23. A system for arbitrating for access to a resource group between a plurality of agents according to a respective programmable weight for each of the agents, the system comprising: PARA2means for programmably mapping each agent to at least one of a plurality of arbitration ports, wherein the respective programmable weight for the agent determines a number of the at least one of the arbitration ports to which the agent is mapped; PARA2means for allocating a sequence of accesses to the resource group among the arbitration ports using a priority ranking of the arbitration ports; PARA2means for dynamically updating the priority ranking of the arbitration ports for each access to the resource group of the sequence; and PARA2means for reverse mapping the allocating of the sequence of the accesses from the arbitration ports to the agents.

* * * * *